Patented May 17, 1949

2,470,088

UNITED STATES PATENT OFFICE 2,470,088

PURIFICATION OF CRUDE MONOFLUORO-DICHLOROMETHANE

Anthony F. Benning and Robert C. McHarness, Woodstown, N. J., and William S. Murray, Wilmington, Del., assignors to Kinetic Chemicals, Inc., Wilmington, Del., a corporation of Delaware No Drawing. Application February 25, 1947, Serial No. 730,744

16 Claims. (Cl. 260—653)

1

This invention relates to the purification of crude monofluorodichloromethane and particularly that which is obtained as a by-product in the manufacture of difluoromonochloromethane and which is contaminated with a minor proportion of acidic substances including at least 0.1% of sulfur dioxide.

Crude monofluorodichloromethane is obtained as a by-product in the manufacture of difluoromonochloromethane and is contaminated with sulfur dioxide and also usually with smaller proportions of HF and traces of HCl, $H_2S$ and $COCl_2$. The crude monofluorodichloromethane also usually contains varying proportions of difluoromonochloromethane and chloroform. Usually, the sulfur dioxide is present in a proportion of from about 0.1% to about 3%, but, in some cases, may be considerably higher. The other acidic substances are generally present in smaller proportion than the sulfur dioxide.

The sulfur dioxide and other acidic substances are objectionable and their removal from the crude monofluorodichloromethane has been difficult and expensive and has presented a serious problem for some time. Attempts to remove these acidic substances from the crude monofluorodichloromethane by fractional distillation have not been entirely successful, generally requiring additional scrubbing with magnesia slurry and have resulted in severe corrosion of the steel fractionating column. Attempts to remove the sulfur dioxide by scrubbing with water have been unsatisfactory because of the inefficiency of the water and the high loss of monofluorodichloromethane by solution in the water. It has also been found impractical to remove the large amounts of sulfur dioxide from the crude material with magnesium oxide slurry because the highly insoluble magnesium sulfite formed continually plugs up the feed line and other parts of the equipment. Scrubbing of the crude material with solutions of strong alkali has also been found to be objectionable because of the rapid rate of hydrolysis of the monofluorodichloromethane which is as high as 30 grams of monofluorodichloromethane per hour per gallon when a 1.5% aqueous solution of sodium hydroxide is employed at 20° C. The use of organic reagents is also impractical because of the high reagent costs, the elaborate equipment required and the difficulty of separating the product from the reagent.

It is an object of the present invention to provide a practical and economical method for the removal of acidic substances, particularly sulfur dioxide, from crude monofluorodichloromethane.

2

A further object is to provide a method for purifying crude monofluorodichloromethane by a scrubbing process which is efficient and economical and which avoids the objectionable features of the methods previously proposed. Other objects are to advance the art. Still other objects will appear hereinafter.

The above and other objects may be accomplished in accordance with our invention which comprises passing a stream of crude monofluorodichloromethane, contaminated with a minor proportion of acidic substances including at least 0.1% of sulfur dioxide and not more than 2% of other acidic substances, through and in intimate contact with an aqueous solution of sodium sulfite initially containing from about 10% to about 20% of sulfite and having a pH substantially above 7 but not above 10 and maintaining the pH of the solution between 7 and 10 by the periodic addition thereto of aqueous sodium hydroxide containing from 5% to 20% NaOH. By such process, the sulfur dioxide, in the crude monofluorodichloromethane, is reduced to about 0.005% or less and the other acidic substances are reduced to no more than traces. Also, by such process, the corrosion of ferrous metals is substantially eliminated so that the process can be satisfactorily carried out in equipment constructed of ferrous metals such as steel. Furthermore, hydrolysis of the monofluorodichloromethane is substantially eliminated.

The proportions of the ingredients in the compositions employed and the proportions of reagents as given herein and in the claims will be understood to be by weight, except where otherwise specifically stated.

Preferably, the process is carried out by passing the crude monofluorodichloromethane in the vapor phase through a scrubber containing the sodium sulfite solution. While the process may be satisfactorily carried out by merely bubbling the vapor through the agitated sodium sulfite solution in a kettle or the like, it is preferable to employ a packed tower with circulation of the solution therethrough and passing the vapor either co-current or counter-current with the solution. The design of the scrubber is not critical, it being necessary merely to so operate as to obtain reasonably good contact between the liquid and the vapor.

The process may also be carried out in the liquid phase by operating under sufficient pressure to maintain the crude monofluorodichloromethane in the liquid state. This corresponds to a pressure in excess of 7 pounds gauge at 20° C.

A suitable method of carrying out the process continuously in the liquid phase would be by feeding the sodium sulfite solution slightly above the bottom of a packed tower and feeding the liquid crude monofluorodichloromethane slightly below the top of the tower. The crude monofluorodichloromethane would pass downward and be separated at the bottom of the tower while the scrubbing liquor would flow out from the top of the tower and would be recycled, the pH being adjusted outside the tower.

At the start of the operation, the scrubbing liquor will contain the sodium sulfite at a concentration of from 10% to 20% and preferably at about 15%. The sodium sulfite may all be present as $Na_2SO_3$, but part may be present as $NaHSO_3$. The absorption of acidic substances from the crude monofluorodichloromethane converts $Na_2SO_3$ to $NaHSO_3$, the $SO_2$ absorbed forming additional amount of $NaHSO_3$. Therefore, the scrubbing liquor contains sodium bisulfite as well as sodium sulfite throughout substantially the entire operation. The absorption of the acidic substances and the conversion of $Na_2SO_3$ to $NaHSO_3$ reduces the pH of the solution. Accordingly, it is desirable to have the pH of the solution substantially above 7 and preferably between 9.5 and 10 at the start of the operation so that the operation can be well started before it becomes necessary to add the sodium hydroxide solution.

When the pH of the sodium sulfite solution has become substantially reduced by the absorption of the acidic substances, aqueous sodium hydroxide is added beneath the surface of the solution to bring the pH of the solution back to substantially its original value and preferably back to about 10. It will usually be preferred to add the aqueous sodium hydroxide when the pH of the solution has been reduced to about 7.2. The aqueous sodium hydroxide should have a concentration of from 5% to 20% NaOH and preferably from about 10% to about 15% NaOH. When the sodium sulfite solution contains about 15% of sulfite, the aqueous sodium hydroxide preferably has a concentration of about 15% NaOH.

During the operation, the concentration of salts in the scrubbing liquor tends to build up until salts begin to precipitate therefrom. The precipitation of salts tends to plug up the equipment and hence the useful life of the solution is limited by such salt precipitation. The amount of NaOH which may be safely added will usually correspond to about one-third of the weight of the sodium sulfite with which the operation was started. When the sodium sulfite solution has a concentration of 15% and the aqueous sodium hydroxide solution has a concentration of 15%, the total volume of aqueous sodium hydroxide which may be safely added before salt precipitation is roughly 30% of the original volume of the sulfite solution. With more concentrated sodium hydroxide solutions, the salt precipitation will be accelerated and hence a smaller volume of aqueous sodium hydroxide can be added. With more dilute solutions of sodium hydroxide, the salt precipitation will be delayed so that larger volumes of the aqueous sodium hydroxide may be added, but when the aqueous sodium hydroxide contains less than 5% of NaOH, the volume of solution and the size of the equipment become impractically large and the sodium sulfite solution becomes rapidly diluted to the point where the advantages of the sodium sulfite are not obtained.

The presence of large amounts of acidic substances, other than sulfur dioxide, also accelerate salt precipitation and limit the useful life and capacity of the sulfite solution. Accordingly, it would be impractical to employ this process for the treatment of crude monofluorodichloromethane containing more than 2% of such other acidic substances.

The process will ordinarily be carried out at about atmospheric temperatures, although any temperatures between the freezing point of the scrubbing liquor and its boiling point may be used. However, no substantial advantage would be obtained by the use of either higher or lower temperatures. Lower temperatures increase the danger of salt precipitation and, at the same time, involve the expense and inconvenience of cooling. Higher temperatures would reduce the danger of salt precipitation, but such advantage would be largely dissipated by the cost and inconvenience of heating and cooling large volumes of gas as well as the scrubbing liquor.

The pressures employed will usually be approximately atmospheric pressures, varying therefrom only as required to insure the flow of the materials. Higher and lower pressures may be used if desired, but without substantial advantage except where it is desired to operate in the liquid phase, in which case suitable pressures will be employed to maintain the materials in the liquid phase at the temperatures employed.

The frequency with which the aqueous sodium hydroxide is added will be dependent upon the concentration of the acidic substances in the crude monofluorodichloromethane and the rate of flow of the crude monofluorodichloromethane through the scrubbing liquor. This can usually be calculated from the acid specifications of the crude material to be treated. It will frequently be found that, when the crude monofluorodichloromethane is fed vapor phase from storage, the concentration of sulfur dioxide and other acidic substances will be higher than the average at the beginning and will diminish as the feed is continued. However, the control is simple as the addition of the aqueous sodium hydroxide will be governed by the pH of the solution and it is merely necessary to determine such pH at reasonably frequent intervals.

The rate of passing the crude monofluorodichloromethane through the scrubbing liquor will be dependent upon the efficiency of contact of the vapors with the scrubbing liquor and on the proportion of acidic substances in the crude monofluorodichloromethane. With an aqueous sulfite solution containing 15% sodium sulfite and crude monofluorodichloromethane containing 3% sulfur dioxide and smaller proportions of other acidic substances, it was found possible to circulate the sulfite solution at a rate of 1100 gallons per hour per square foot of tower cross section through a packed tower having a length 50 times its diameter and to pass the crude monofluorodichloromethane therethrough co-currently at a rate as high as 900 pounds per hour per square foot of tower cross section. The sulfur dioxide concentration in the crude monofluorodichloromethane was thereby reduced to 0.005% and the concentration of the other acidic substances was reduced to no more than traces. The process has been successfully employed for purifying crude monofluorodichloromethane containing as high as 5% of sulfur dioxide.

In order to more clearly illustrate our invention and a preferred mode of carrying the same into effect, the following example is given in which the process was carried out at substantially atmospheric pressures:

Example

Twenty-two lbs. of $Na_2SO_3$ was dissolved in 15 gallons of water at 20° C., charged to a reservoir, and circulated at the rate of ½ gallon per minute through a 9′ section of 2″ pipe packed with ½″ steel Raschig rings. Crude $CHCl_2F$, comprising essentially 79.5% $CHCl_2F$, 13% $CHClF_2$, 6.5% $CHCl_3$, 0.5% $SO_2$, 0.4% HF and traces of HCl, $H_2S$ and $COCl_2$ was then passed vapor phase through the scrubber co-current with the sulfite solution at an average rate of 10 lbs. per hour. The solution was maintained between a pH of 7 and 10 by the periodic addition of 15% caustic soda solution. This procedure was followed until a total of 5 gallons of caustic solution had been added, after which the spent solution was ditched and replaced with fresh sulfite solution. This cycle was repeated 11 times in order to purify a total of 5600 lbs. of crude $CHCl_2F$. In other words, a total of 242 lbs. of $Na_2SO_3$ and 80 lbs. of caustic was required to remove the 28 lbs. of $SO_2$ and 22 lbs. of HF and the other acidic substances associated with the 5600 lbs. of crude $CHCl_2F$.

By operating with the pH of the sulfite solution maintained between 7 and 10, the corrosion rate, for the cast iron impeller of the sulfite circulating pump, was only 0.006 in./month and the $CHCl_2F$ hydrolysis loss was limited to <3 lbs. for the whole operation.

It will be understood that the above example is given for illustrative purposes solely and that many variations and modifications can be made within the scope of our invention as heretofore described without departing from the spirit or scope of our invention. If desired, the last traces of acidic substances may be removed from the purified monofluorodichloromethane by scrubbing with magnesia slurry, followed by drying and fractionating.

It will be apparent that, by our invention, we have provided a novel, efficient, simple and economical process for purifying crude monofluorodichloromethane which may be carried out in equipment constructed of ferrous metals without hydrolyzing or contaminating the product and, at the same time, avoiding serious and objectionable corrosion of the equipment.

We claim:

1. The process for purifying crude monofluorodichloromethane contaminated with a minor proportion of acidic substances including at least 0.1% of sulfur dioxide and not more than 2% of other acidic substances, which comprises passing a stream of the crude monofluorodichloromethane through and in intimate contact with an aqueous solution of sodium sulfite initially containing from about 10% to about 20% of sulfite and having a pH substantially above 7 but not above 10, and maintaining the pH of the solution between 7 and 10 by the periodic addition thereto of aqueous sodium hydroxide containing from 5% to 20% NaOH.

2. The process of claim 1 wherein the crude monofluorodichloromethane is in the vapor phase.

3. The process for purifying crude monofluorodichloromethane contaminated with a minor proportion of acidic substances including at least 0.1% of sulfur dioxide and not more than 2% of other acidic substances, which comprises passing a stream of the crude monofluorodichloromethane through and in intimate contact with an aqueous solution of sodium sulfite initially containing from about 10% to about 20% of sulfite and having a pH substantially above 7 but not above 10, and maintaining the pH of the solution between 7 and 10 by the addition thereto of aqueous sodium hydroxide containing from about 10% to about 15% NaOH whenever the pH of the solution is substantially reduced by the absorption of acidic substances from the crude monofluorodichloromethane.

4. The process of claim 3 wherein the crude monofluorodichloromethane is in the vapor phase.

5. The process for purifying crude monofluorodichloromethane contaminated with a minor proportion of acidic substances including at least 0.1% of sulfur dioxide and not more than 2% of other acidic substances, which comprises passing a stream of the crude monofluorodichloromethane through and in intimate contact with an aqueous solution of sodium sulfite initially containing from about 10% to about 20% of sulfite and having a pH substantially above 7 but not above 10, and, whenever the pH of the solution is reduced to about 7.2 by the absorption of acidic substances from the crude monofluorodichloromethane, adding to the solution aqueous sodium hydroxide containing from 5% to 20% NaOH in an amount to bring the pH back to about its original value but not above 10.

6. The process of claim 5 wherein the crude monofluorodichloromethane is in the vapor phase.

7. The process for purifying crude monofluorodichloromethane contaminated with a minor proportion of acidic substances including at least 0.1% of sulfur dioxide and not more than 2% of other acidic substances, which comprises passing a stream of the crude monofluorodichloromethane through and in intimate contact with an aqueous solution of sodium sulfite initially containing from about 10% to about 20% of sulfite and having a pH substantially above 7 but not above 10, and, whenever the pH of the solution is reduced to about 7.2 by the absorption of acidic substances from the crude monofluorodichloromethane, adding to the solution aqueous sodium hydroxide containing from about 10% to about 15% NaOH in an amount to bring the pH back to about its original value but not above 10.

8. The process of claim 7 wherein the crude monofluorodichloromethane is in the vapor phase.

9. The process for purifying crude monofluorodichloromethane contaminated with a minor proportion of acidic substances including at least 0.1% of sulfur dioxide and not more than 2% of other acidic substances, which comprises passing a stream of the crude monofluorodichloromethane through and in intimate contact with an aqueous solution of sodium sulfite initially containing from about 10% to about 20% of sulfite and having a pH between 9.5 and 10, and, whenever the pH of the solution is reduced to about 7.2 by the absorption of acidic substances from the crude monofluorodichloromethane, adding to the solution aqueous sodium hydroxide containing from about 10% to about 15% NaOH in an amount to bring the pH back to between 9.5 and 10.

10. The process of claim 9 wherein the crude monofluorodichloromethane is in the vapor phase.

11. The process for purifying crude monofluorodichloromethane contaminated with a minor proportion of acidic substances including at least 0.1% of sulfur dioxide and not more than 2% of other acidic substances, which comprises passing a stream of the crude monofluorodichloromethane through and in intimate contact with an aqueous solution of sodium sulfite initially containing about 15% of sulfite and having a pH between 9.5 and 10, and, whenever the pH of the solution is reduced to about 7.2 by the absorption of acidic substances from the crude monofluorodichloromethane, adding to the solution aqueous sodium hydroxide containing from about 10% to about 15% NaOH in an amount to bring the pH back to between 9.5 and 10.

12. The process of claim 11 wherein the crude monofluorodichloromethane is in the vapor phase.

13. The process for purifying crude monofluorodichloromethane contaminated with from 0.1% to about 5% of sulfur dioxide and up to about 2% of HF, HCl, $H_2S$ and $COCl_2$, which comprises passing a stream of the crude monofluorodichloromethane through and in intimate contact with an aqueous solution of sodium sulfite initially containing from about 10% to about 20% of sulfite and having a pH substantially above 7 but not above 10, and, whenever the pH of the solution is reduced to about 7.2 by the absorption of acidic substances from the crude monofluorodichloromethane, adding to the solution aqueous sodium hydroxide containing from about 10% to about 15% NaOH in an amount to bring the pH back to about its original value but not above 10.

14. The process of claim 13 wherein the crude monofluorodichloromethane is in the vapor phase.

15. The process for purifying crude monofluorodichloromethane contaminated with from 0.1% to about 5% of sulfur dioxide and up to about 2% of HF, HCl, $H_2S$ and $COCl_2$, which comprises passing a stream of the crude monofluorodichloromethane through and in intimate contact with an aqueous solution of sodium sulfite initially containing about 15% of sulfite and having a pH substantially above 7 but not above 10, and, whenever the pH of the solution is reduced to about 7.2 by the absorption of acidic substances from the crude monofluorodichloromethane, adding to the solution aqueous sodium hydroxide containing about 15% NaOH in an amount to bring the pH back to about its original value but not above 10.

16. The process of claim 15 wherein the crude monofluorodichloromethane is in the vapor phase.

ANTHONY F. BENNING.
ROBERT C. McHARNESS.
WILLIAM S. MURRAY.

REFERENCES CITED

The following references are of record in the file of this patent:

UNITED STATES PATENTS

| Number | Name | Date |
|---|---|---|
| 1,946,195 | Daudt | Feb. 6, 1934 |
| 2,024,095 | Daudt et al. | Dec. 10, 1935 |
| 2,080,528 | Bowman et al. | May 18, 1937 |